US007543282B2

(12) United States Patent
Chou

(10) Patent No.: US 7,543,282 B2
(45) Date of Patent: Jun. 2, 2009

(54) METHOD AND APPARATUS FOR SELECTIVELY EXECUTING DIFFERENT EXECUTABLE CODE VERSIONS WHICH ARE OPTIMIZED IN DIFFERENT WAYS

(75) Inventor: Yuan C. Chou, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 184 days.

(21) Appl. No.: 11/389,579

(22) Filed: Mar. 24, 2006

(65) Prior Publication Data

US 2007/0226722 A1 Sep. 27, 2007

(51) Int. Cl.
*G06F 9/45* (2006.01)

(52) U.S. Cl. .................................................... 717/151
(58) Field of Classification Search ................. 717/116, 717/120–121, 150–154, 158–161; 718/100; 714/38; 712/227; 711/150, 165; 703/24
See application file for complete search history.

(56) References Cited

U.S. PATENT DOCUMENTS

| 5,915,114 | A   | * | 6/1999  | McKee et al. ............... 717/128 |
| 5,944,819 | A   | * | 8/1999  | Kumar et al. .................. 713/1 |
| 6,427,234 | B1  | * | 7/2002  | Chambers et al. ........... 717/140 |
| 6,738,967 | B1  | * | 5/2004  | Radigan ...................... 717/146 |
| 6,941,549 | B1  | * | 9/2005  | Holder et al. ............... 717/162 |
| 6,947,955 | B2  | * | 9/2005  | Cox et al. ................. 707/104.1 |
| 6,993,757 | B2  | * | 1/2006  | Rajagopalan ............... 717/160 |
| 7,225,309 | B2  | * | 5/2007  | DeWitt et al. ............... 711/165 |
| 7,231,531 | B2  | * | 6/2007  | Cupps et al. ................ 713/322 |
| 2003/0208749 | A1 | * | 11/2003 | Rajagopalan ............... 717/158 |
| 2004/0215361 | A1 | * | 10/2004 | Hlotyak et al. .............. 700/121 |
| 2005/0081010 | A1 | * | 4/2005  | DeWitt et al. ............... 711/165 |
| 2005/0081019 | A1 | * | 4/2005  | DeWitt et al. ............... 712/227 |
| 2005/0081107 | A1 | * | 4/2005  | DeWitt et al. ................. 714/38 |
| 2006/0136867 | A1 | * | 6/2006  | Schneider et al. ........... 717/106 |
| 2007/0156385 | A1 | * | 7/2007  | Guenthner et al. ........... 703/24 |

OTHER PUBLICATIONS

Voss; A Framework for Remote Dynamic Program Optimization; ACM; Jul. 2000.*
Diniz; "Dynamic Feedback: An Effective Technique for Adaptive Computing"; ACM; Jun. 1997.*
Diniz; Dynamic Feedback; ACM; Jun. 1997.

* cited by examiner

*Primary Examiner*—John Chavis
(74) *Attorney, Agent, or Firm*—Park, Vaughan & Fleming LLP

(57) ABSTRACT

One embodiment of the present invention provides a system that selectively executes different versions of executable code for the same source code. During operation, the system first receives an executable code module which includes two or more versions of executable code for the same source code, wherein the two or more versions of the executable code are optimized in different ways. Next, the system executes the executable code module by first evaluating a test condition, and subsequently executing a specific version of the executable code based on the outcome of the evaluation, so that the execution is optimized for the test condition.

21 Claims, 3 Drawing Sheets

METHOD AND APPARATUS FOR SELECTIVELY EXECUTING DIFFERENT EXECUTABLE CODE VERSIONS WHICH ARE OPTIMIZED IN DIFFERENT WAYS

BACKGROUND

1. Field of the Invention

The present invention relates to techniques for improving computer system performance. More specifically, the present invention relates to a method and an apparatus for selectively executing differently optimized versions of executable code, which are generated from the same source code, wherein the different versions of the executable code are optimized for different runtime conditions and/or different system configurations.

2. Related Art

In order to improve the performance of computer applications, the executable code for an application is often optimized for a specific processor type. However, users often need to migrate an application to a new system which may have a different processor type than the one that was used to optimize the application. Nevertheless, users expect their existing executable codes not only to run, but to run well on a new system. Unfortunately, many of the current optimization techniques that improve performance for a specific processor type can degrade performance for other processor types.

This problem becomes more complicated for systems equipped with multi-core processors. In such systems, even if an application is executed on the processor of the type it was optimized for, good performance may not be achieved because it is impossible for the compiler to anticipate how heavily utilized the cores will be at runtime. For example, if the compiler optimizes the application by employing aggressive speculation and the cores are heavily utilized at runtime, the aggressive speculation may excessively consume highly contended processor resources, thereby degrading the performance of the application as well as the performance of other applications running on the same cores.

Another commonly encountered problem that can severely degrade performance is caused by processor temperature increases during execution. Typically, when the processor/core temperature exceeds a specific limit, the processor will either decrease its clock-frequency, or will temporarily disable one or more of its cores. Unfortunately, either reducing the clock-frequency or temporarily disabling one or more cores can lead to unacceptable performance degradation.

In all of the above scenarios, optimal performance of the application cannot be achieved because the associated executable code was optimized for conditions and/or system configurations which are different from the actual runtime conditions and/or system configurations.

Hence, what is needed is a method and an apparatus for achieving optimized performance while executing an application under different operating conditions and on different systems without the above-described problems.

SUMMARY

One embodiment of the present invention provides a system that selectively executes different versions of executable code for the same source code. During operation, the system first receives an executable code module which includes two or more versions of executable code for the same source code, wherein the two or more versions of the executable code are optimized in different ways. Next, the system executes the executable code module by first evaluating a test condition, and subsequently executing a specific version of the executable code based on the outcome of the evaluation, so that the execution is optimized for the test condition.

In a variation on this embodiment, the system evaluates the test condition by executing a branch instruction in the executable code module, wherein the branch instruction directs the execution to a specific version of the executable code based on the outcome of the evaluation.

In a variation on this embodiment, prior to receiving the executable code module, the system creates the executable code module by combining the two or more differently optimized versions of the executable code into the same executable code module.

In a variation on this embodiment, the system evaluates the test condition by evaluating a condition associated with the runtime state of the system.

In a further variation, the condition can be associated with: (1) core utilization; (2) processor/core temperature; (3) memory bandwidth; and (4) other system performance criteria.

In a variation on this embodiment, the system evaluates the test condition by obtaining the processor type.

In a variation on this embodiment, the system produces the two or more versions of the executable code by compiling the source code with different optimization parameters.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Computer System

Figure 1:
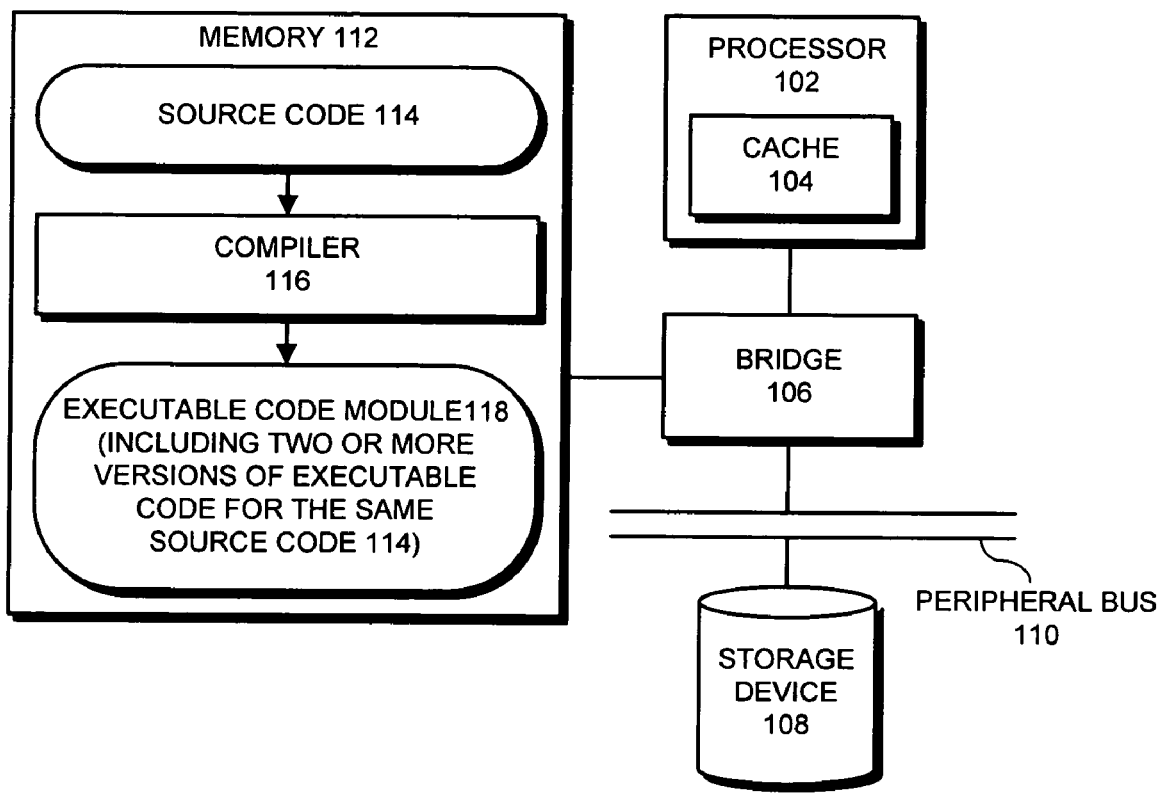
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes a cache 104 that stores code and data for execution by processor 102. Note that processor 102 can include a single-core processor, a dual-core processor, or a multi-core processor with more than two cores.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102.

As illustrated in FIG. 1, memory 112 contains compiler 116. Compiler 116 converts source code 114 into executable code module 118. In doing so, compiler 116 incorporates differently optimized versions of executable code for the same source code 114 into executable code module 118. This process is described in more detail below with reference to FIG. 2.

Note that although the present invention is described in the context of computer system 100 illustrated in FIG. 1, the present invention can generally operate on any type of computing device. Hence, the present invention is not limited to the specific computer system 100 illustrated in FIG. 1.

Compiler and Differently Optimized Versions of Executable Code

Figure 2:
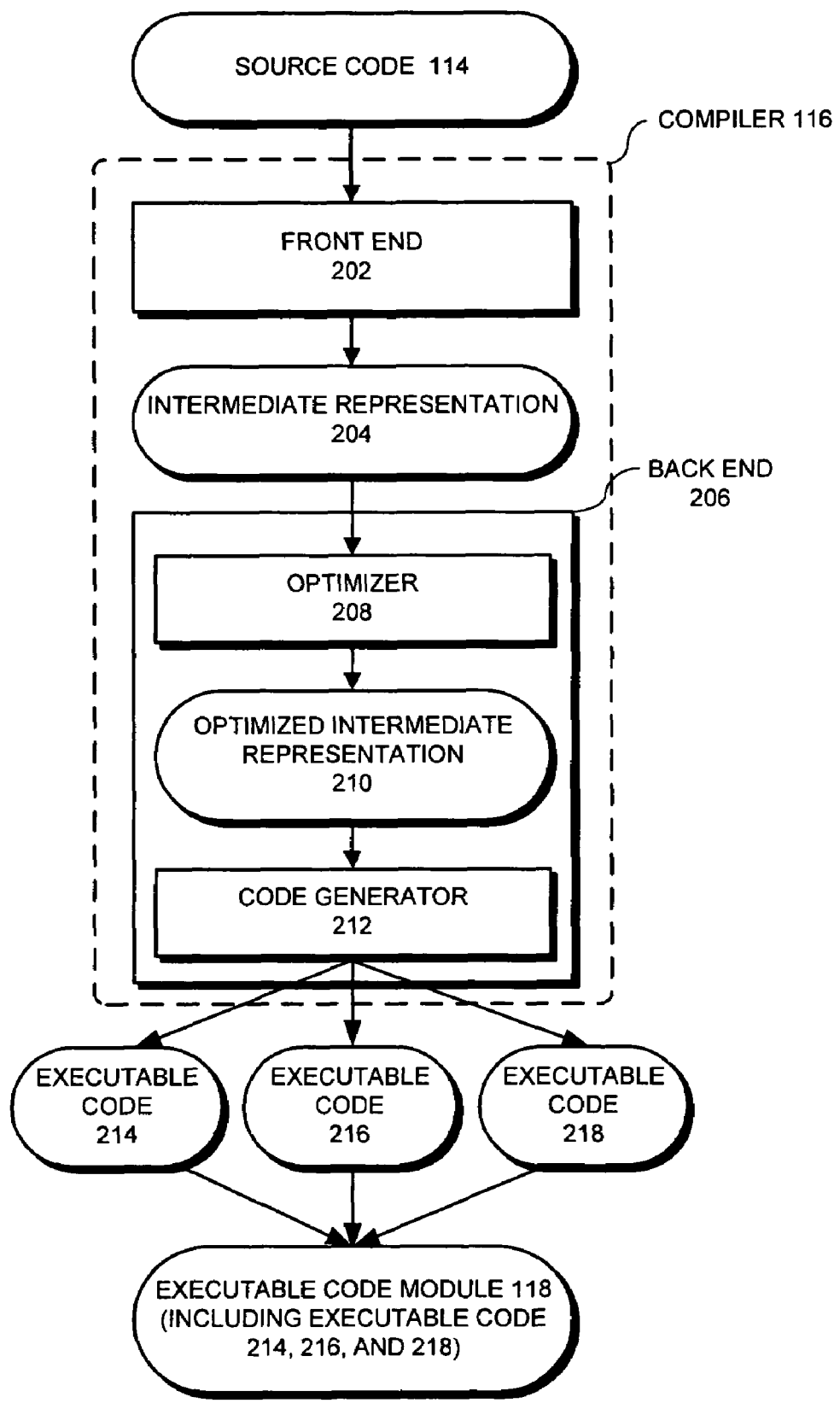
FIG. 2 illustrates the structure of compiler which produces differently optimized versions of executable code in accordance with an embodiment of the present invention.

FIG. 2 illustrates the structure of compiler 116 which produces differently optimized versions of executable code in accordance with an embodiment of the present invention. Compiler 116 takes as input source code 114 and outputs executable code module 118. Note that source code 114 may include any computer program written in a high-level programming language, such as the JAVA™ programming language. Executable code module 118 typically includes a set of executable instructions for a specific processor architecture. In one embodiment of the present invention, executable code module 118 includes two or more versions of executable code for the same source code 114, wherein each version of executable code is optimized for a different processor architecture and/or runtime condition. We will describe this in more detail below.

Compiler 116 comprises a number of components, including front end 202 and back end 206. Front end 202 takes in source code 114 and parses source code 114 to produce intermediate representation 204.

Intermediate representation 204 feeds into back end 206, which produces executable code module 118. Within back end 206, intermediate representation 204 feeds through optimizer 208, and the resulting optimized intermediate representation 210 feeds though code generator 212. Code generator 212 generates three versions of executable code 214, 216, and 218, wherein each of the versions 214, 216, and 218 is optimized based on different optimization parameters. Finally, compiler 116 produces executable code module 118 by combining versions 214, 216, and 218 into the same executable code module 118. Note that although FIG. 2 illustrates three versions of executable code, code generator 212 can in general produce two or more versions of executable code for the same source code 114.

Note that compiler 116 can generate different versions of executable code for either an entire program or for specific functions that are frequently executed, wherein each version is optimized in accordance with a different optimization criterion. These optimization criteria can include, but are not limited to: degree of speculation, performance portability (i.e. runs well across processor types), system resource utilization, and low power-consumption.

Selectively Executing an Executable Code Through Branch Instruction

Figure 3:
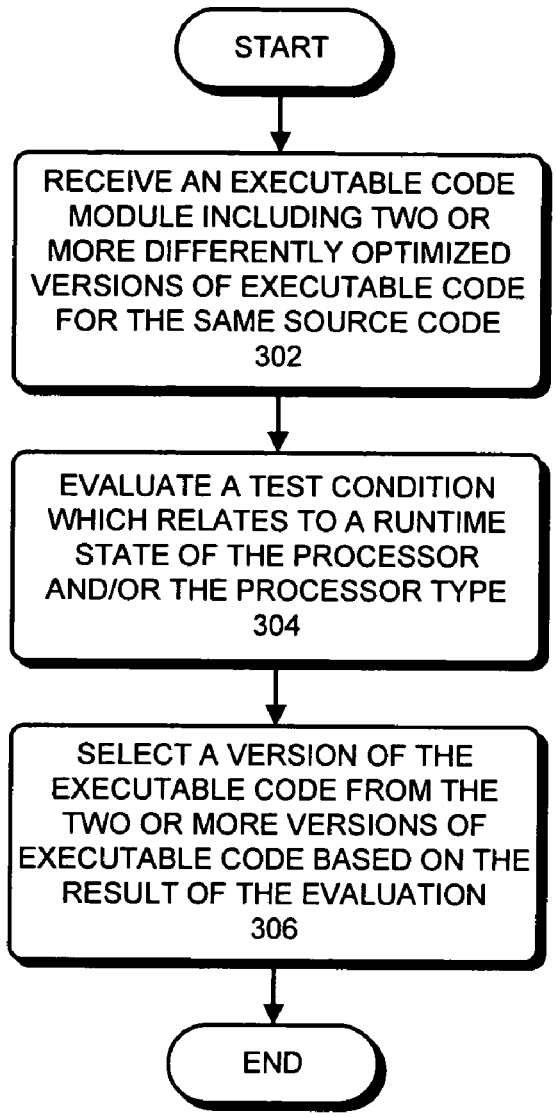
FIG. 3 presents a flowchart illustrating the process of selectively executing different versions of executable code in accordance with an embodiment of the present invention.

During execution of executable code module 118, which includes different versions of executable code for the same source code 114, the processor uses dynamic information to select which version of the executable code to execute. More specifically, FIG. 3 presents a flowchart illustrating the process of selectively executing different versions of executable code in accordance with an embodiment of the present invention.

During operation, the processor first receives an executable code module which includes two or more versions of executable code for the same source code, wherein the two or more versions are optimized in different ways (step 302).

Next, the processor evaluates a test condition, which relates to a runtime state of the processor and/or the processor type (step 304). The processor subsequently selects a version of executable code to execute based on the evaluation result, wherein the selected version of the executable code is optimized for the runtime state of the processor and/or the processor type (step 306).

To enable above-described runtime selection process, one embodiment of the present invention extends the user-level instruction set architecture (ISA) of the processor with a new conditional branch instruction. Specifically, during program execution, the new conditional branch instruction redirects control flow based on the runtime state of the processor and/or the processor type. Note that conventional conditional branch instructions redirect control flow simply based on program data values.

As an example, consider a case when function foo( ) calls function bar( ):

```
foo:
...
call bar
...
```

In one embodiment of the present invention, the compiler generates the following executable code module for foo( ) which comprises two versions of executable code for function bar( ), namely bar1( ) and bar2( ):

```
foo:
...
bxx bar1
call bar2
...
```

Note that bar1 is a version of bar( ) optimized for one criterion and bar2 is another version of bar( ) optimized for another criterion. bxx is the branch instruction which is used by the processor to select which version of bar( ) to execute at runtime. We describe three branch conditions for this new conditional branch instruction in more details below.

Branch on Core Utilization

This branch instruction redirects control flow based on the runtime utilization of the core, wherein the branch instruction can have one source operand: the branch target. Specifically, the processor evaluates the current core utilization, and selects the branch outcome depending on whether a predetermined level of core utilization is met or not met. In one embodiment of the present invention, the branch is taken if more than half of the available threads on the core are utilized.

In order to take advantage of this branch instruction, the compiler generates two code versions: (1) a first code version is optimized for the condition of a light core utilization, for example, none or few other threads are running on the same core; and (2) a second code version is optimized for the condition of a heavy core utilization, when a significant number of other threads are running on the same core. Hence, at runtime, the processor evaluates core utilization through the branch instruction. In one embodiment of the present invention, if the processor detects more than half of the available threads on the core are utilized, the second code version is executed. Otherwise, the first code version is executed.

Note that this branch instruction enables an executable code module to run well regardless of how heavily utilized the processor cores are at runtime.

Branch on Processor/Core Temperature

This instruction redirects control flow based on the runtime temperature of the processor or core, wherein the instruction can have one source operand: the branch target. Specifically, the processor evaluates the current processor/core temperature, and selects the branch if a predetermined temperature limit is met or not met. In one embodiment of the present invention, the branch is taken if the temperature exceeds the predetermined temperature limit (note that the predetermined temperature limit can optionally be specified in a source operand register).

In order to take advantage of this branch instruction, the compiler generates two code versions: (1) a first code version is optimized for peak performance of the processor; and (2) a second code version is optimized for a low power-consumption mode. Hence, at runtime, the processor evaluates processor/core temperature through the branch instruction. In one embodiment of the present invention, if the processor detects that the processor/core temperature exceeds the predetermined limit, the second code version is executed. Otherwise, the first code version is executed.

Note that in conventional processors, when the processor/core temperature exceeds the limit, the processor will either decrease its clock-frequency or will temporarily disable one or more of its cores. However, better performance may be achieved by running the above-described low power-consumption version of the executable code, which allows the clock-frequency to be maintained and all the cores to continue running.

Branch on Processor Type

This instruction redirects control flow based on the type of the processor, wherein the instruction can have two source operands: the branch target and a bit mask of processor types. Specifically, the processor first obtains the processor type, and then selects the branch outcome based on the processor type. In one embodiment of the present invention, the branch is taken if the processor type is not one of those specified in the bit mask.

In order to take advantage of this instruction, the compiler generates two code versions: a first code version is optimized for a particular processor type; and a second code version is optimized to run well for all processor types. Hence, at runtime, the processor evaluates the processor type through the branch instruction. In one embodiment of the present invention, if the processor determines that the processor type is not one of those specified in the bit mask, the second code version is executed. Otherwise, the first code version is executed.

This branch instruction allows an executable code module to run well on different processor types. For example, the executable code module can be optimized to execute on two different processors which have significantly different microarchitectures and different resource constraints.

Note that the above-described branch technique is not limited to the three listed runtime states and processor types. The general concept of the technique can be applied to other system configurations and other runtime states of the processor, as well as runtime states of the system, including system resource utilization, e.g., memory bandwidth.

Branch Instruction with a General-Purpose Resister

In one embodiment of the present invention, only one new conditional branch instruction is required for testing different runtime states of a processor. Such an instruction can have two source operands: a branch target and a general-purpose register. The general-purpose register is used by the compiler to encode both the optimization criterion that was used to generate the version of executable code at the branch target (e.g., bar1), and the optimization criterion that was used to generate the version of executable code at the fall-through path (e.g., bar2). At runtime, the processor compares the contents of this register with its runtime state and/or processor type to decide whether the branch should be taken.

In one embodiment of the present invention, when the general-purpose register is used, the compiler generates the following code for the same function foo( ) described above:

```
foo:
   ...
   or %g0, 0x10, %10
   bxy %10, bar1
   call bar2
   ...
```

Note that bar1 is a version of bar optimized for one criterion while bar2 is another version of bar optimized for another criterion. The "or" instruction is used by the compiler to set up the integer register % 10 in order to communicate to the processor what optimization criterion is used. Note that other instructions or instruction combinations can also be used to set up the register. In this example, register 0x10 contains the encoded value of the optimization criterion. During execution, the processor uses the branch instruction "bxy" to compare the runtime value of the criterion with the contents of the register, and subsequently selects one version of bar to execute. Note that the same instruction bxy can be used for different optimization criteria, including, but not limited to: core utilization, processor/core temperature, and processor type.

Figure 4:
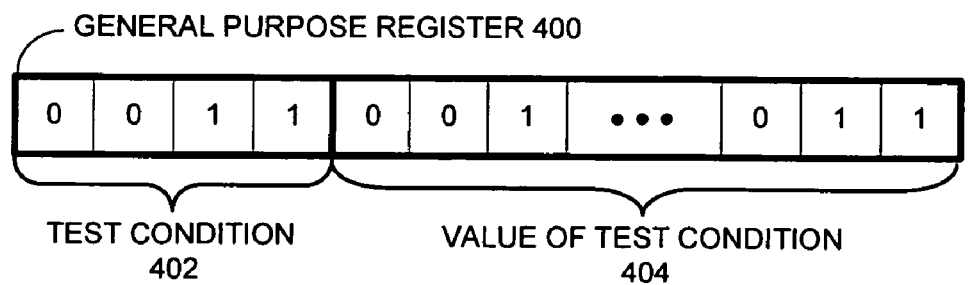
FIG. 4 illustrates the general-purpose register which includes a test condition field and a value field in accordance with an embodiment of the present invention.

In one embodiment of the present invention, the general-purpose register can include two fields. FIG. 4 illustrates a general-purpose register 400 which includes a test-condition field 402 and a value field 404 in accordance with an embodiment of the present invention. The test-condition field identifies what test condition is being considered by the branch instruction while the value field contains the runtime value of the test condition.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively executing different versions of executable code for the same source code, the method comprising:
   receiving an executable code module which includes two or more versions of executable code for the same source code, wherein the two or more versions are optimized in different ways; and
   executing the executable code module, wherein executing the executable code module involves:
      evaluating a test condition, wherein evaluating the test condition involves determining a temperature of a processor/core; and
      executing a specific version of the executable code based on the outcome of the evaluation, wherein the specific version of the executable code is optimized for the test condition.

2. The method of claim 1, wherein evaluating the test condition involves executing a branch instruction in the executable code module, wherein the branch instruction directs the execution to the specific version of the executable code based on the outcome of the evaluation.

3. The method of claim 1, wherein prior to receiving the executable code module, the method further comprises creating the executable code module by combining the two or more differently optimized versions of the executable code into the executable code module.

4. The method of claim 1, wherein evaluating the test condition involves evaluating a condition associated with a runtime state of a system.

5. The method of claim 4, wherein evaluating the test condition further involves determining one or more of:
   a core utilization;
   a memory bandwidth utilization; or
   other system performance criteria.

6. The method of claim 1, wherein evaluating the test condition further involves obtaining a processor type.

7. The method of claim 1, further comprising producing the two or more versions of the executable code by compiling the source code with different optimization parameters.

8. A computer-readable storage medium storing instructions that when executed by a computer cause the computer to perform a method for selectively executing different versions of executable code for the same source code, the method comprising:
   receiving an executable code module which includes two or more versions of executable code for the same source code, wherein the two or more versions are optimized in different ways; and
   executing the executable code module, wherein executing the executable code module involves:
      evaluating a test condition, wherein evaluating the test condition involves determining a temperature of a processor/core; and
      executing a specific version of the executable code based on the outcome of the evaluation, wherein the specific version of the executable code is optimized for the test condition.

9. The computer-readable storage medium of claim 8, wherein evaluating the test condition involves executing a branch instruction in the executable code module, wherein the branch instruction directs the execution to the specific version of the executable code based on the outcome of the evaluation.

10. The computer-readable storage medium of claim 8, wherein prior to receiving the executable code module, the method further comprises creating the executable code module by combining the two or more differently optimized versions of the executable code into the executable code module.

11. The computer-readable storage medium of claim 8, wherein evaluating the test condition involves evaluating a condition associated with a runtime state of a system.

12. The computer-readable storage medium of claim 11, wherein evaluating the test condition further involves determining one or more of:
    a core utilization;
    a memory bandwidth utilization; or
    other system performance criteria.

13. The computer-readable storage medium of claim 8, wherein evaluating the test condition further involves obtaining a processor type.

14. The computer-readable storage medium of claim 8, further comprising producing the two or more versions of the executable code by compiling the source code with different optimization parameters.

15. An apparatus for selectively executing different versions of executable code for the same source code, comprising:
    a receiving mechanism configured to receive an executable code module which includes two or more versions of executable code for the same source code, wherein the two or more versions are optimized in different ways; and
    an execution mechanism configured to execute the executable code module, wherein while executing the executable code module, the execution mechanism is configured to:
       evaluate a test condition, wherein evaluating the test condition involves determining a temperature of a processor/core; and to
       execute a specific version of the executable code based on the outcome of the evaluation, wherein the specific version of the executable code is optimized for the test condition.

16. The apparatus of claim 15, wherein the execution mechanism is configured to execute a branch instruction in the executable code module, wherein the branch instruction directs the execution to the specific version of the executable code based on the outcome of the evaluation.

17. The apparatus of claim 15, further comprising a creation mechanism configured to create the executable code module by combining the two or more differently optimized versions of the executable code into the executable code module.

18. The apparatus of claim 15, wherein while evaluating the test condition, the execution mechanism is configured to evaluate a condition associated with a runtime state of a system.

19. The apparatus of claim 18, wherein evaluating the test condition further involves determining one or more of:
    a core utilization;

a memory bandwidth utilization; or other system performance criteria.

20. The apparatus of claim 15, wherein while evaluating the test condition, the execution mechanism is configured to obtain a processor type.

21. The apparatus of claim 15, further comprising a compilation mechanism configured to produce the two or more versions of the executable code by compiling the source code with different optimization parameters.

\* \* \* \* \*